United States Patent [19]

Lyman et al.

[11] Patent Number: 5,129,945

[45] Date of Patent: Jul. 14, 1992

[54] SCRAP TREATMENT METHOD FOR RARE EARTH TRANSITION METAL ALLOYS

[75] Inventors: Jane W. Lyman, Salt Lake City; Glenn R. Palmer, Murray, both of Utah

[73] Assignee: The United States of America as represented by the Secretary of the Interior

[21] Appl. No.: 602,491

[22] Filed: Oct. 24, 1990

[51] Int. Cl.$^5$ .............................................. C01F 17/00
[52] U.S. Cl. ...................................... 75/416; 423/263
[58] Field of Search ...................... 75/416; 423/263, 25

[56] References Cited

U.S. PATENT DOCUMENTS

| | | | |
|---|---|---|---|
| 3,692,671 | 9/1972 | Recht | 423/263 |
| 3,821,356 | 6/1974 | Baldwin | 423/263 |
| 4,612,047 | 9/1986 | Schmidt | 420/83 |
| 4,636,353 | 1/1987 | Seon | 420/416 |
| 4,741,893 | 5/1988 | Watanabe | 423/471 |
| 4,770,702 | 9/1988 | Naoyuki | 75/244 |

FOREIGN PATENT DOCUMENTS 62187112 of 0000 Japan .

OTHER PUBLICATIONS

Y. Wei, N. Sato, M. Nanjo, "Solubility of Samarium Sulfate and Neodymium Sulfate in Sulfate Solutions. Fundamental Study on the Recycling of Rare Earth Magnet Materials", *Shigan to Sozai*, 105(12) (1989), pp. 965-70, CA Vol. 112 40110y.

J. E. Dutrizac, "The Hydrothermal Conversion of Jarosite-Type Compounds to Hematite", *Productivity and Technology in the Metallurgical Industries*, 1989, pp. 587-612.

V. Arregi, A. R. Gordn, G. Steintveit, "The Jarosite Process-Past, Present, and Future", *Lead-Sinc-Tin* '80, 1979 pp. 97-123.

F. A. Cotton, G. Wilkinson, *Advanced Inorganic Chemistry* 3rd Ed., 1972 p. 1067.

J. E. Dutrizac, "The Behavior of Impurities During Jarosite Precipitation", Mineral Sciences Lab., CAN-MET.

H. Seto, T. Nori, "The Separation and Purification of Rare-Earth Elements-Solvent Extraction and Ion-Exchange Chromatography", *Metallurgical Review of MMIJ*, Vol 6(2) (1898), pp. 139-162.

*Treatise on Analytical Chemistry*, Vol. 8, 1963, Chemical Abstracts 108:2500m, Recovery of rare earth metals from iron-alloy scrap.

Chemical Abstracts 101:213417g, Khim. Tekhnol, 1984.

*The Handbook on the Physics and Chemistry of Rare Earths*, 1978.

Chemical Abstract 108:82900d, Phase diagram of iron di-fluoride-lanthanide tri-fluoride systems, 1987.

*The Rare Earths*, John Wiley & Sons, Inc., 1961, pp. 84-85.

Methods of Producing Pure Rare Earth Metals As Developed At Iowa State College, Spedding and Daane, 1954.

Primary Examiner—Peter D. Rosenberg
Attorney, Agent, or Firm—Reising, Ethington, Barnard, Perry & Milton

[57] ABSTRACT

A method of treating rare earth-transition metal alloy scrap involves in one embodiment dissolving the scrap in aqueous sulfuric acid solution, reacting the solution with a hydroxide of an alkali element (e.g., Na or K) or ammonium to precipitate a double sulfate salt of the rare earth and the alkali element or ammonium, and separating the salt from the solution. The double sulfate salt is converted to a rare earth salt, such as rare earth fluoride, amenable for use in metallothermic reduction processes to make rare earth metal or alloys.

40 Claims, 1 Drawing Sheet

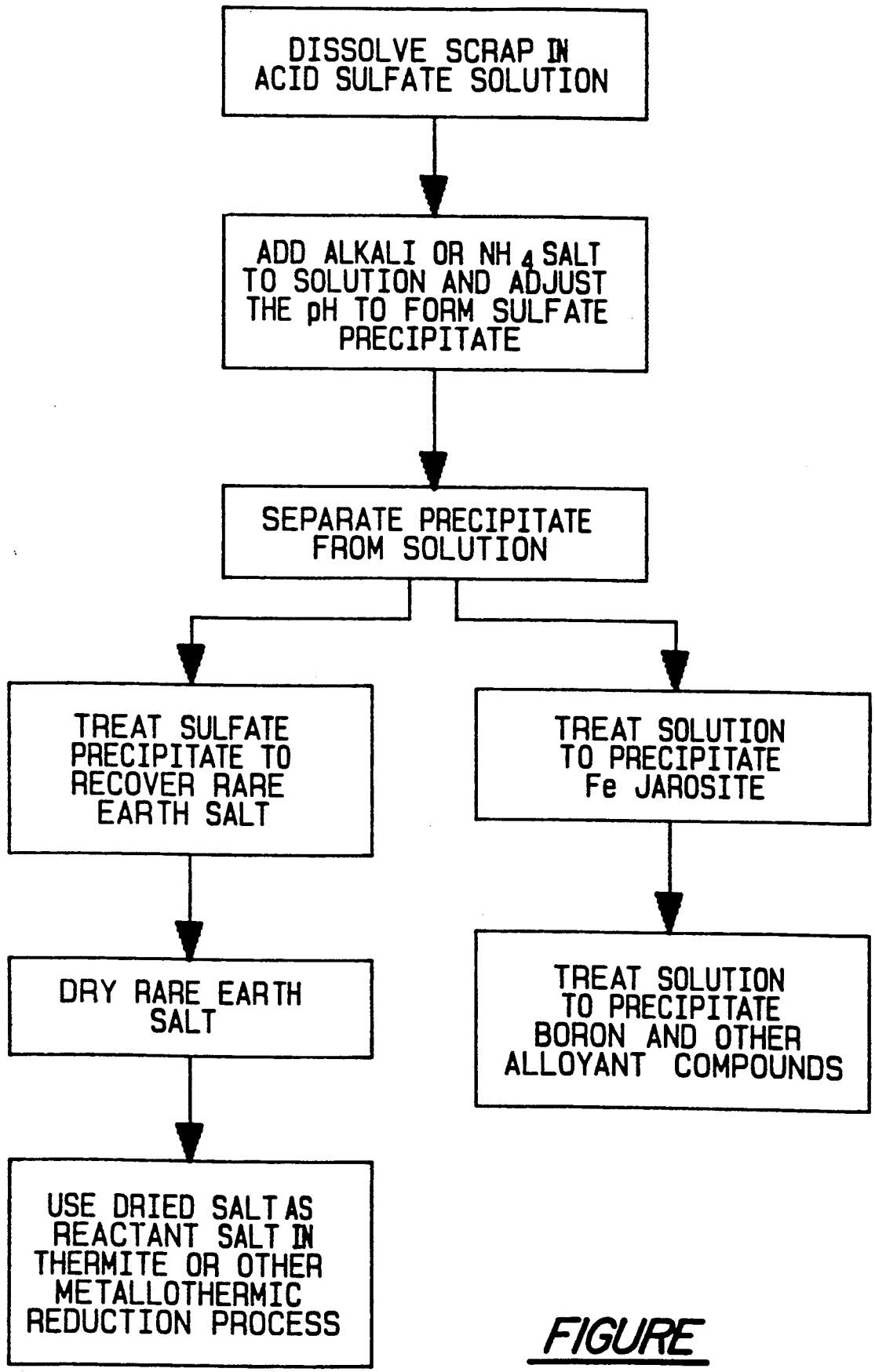
FIGURE

SCRAP TREATMENT METHOD FOR RARE EARTH TRANSITION METAL ALLOYS

FIELD OF THE INVENTION

The present invention relates to the treatment of rare earth-transition metal alloy scrap to recover the rare earth metal in a form (e.g., a rare earth metal salt) amenable for reuse in the thermite reduction process or in other metallothermic reduction processes for preparing the respective rare earth metal or alloy.

BACKGROUND OF THE INVENTION

A number of rare earth-iron alloys have been developed which exhibit desirable magnetostrictive properties as described, for example, by Savage et al in U.S. Pat. No. 4,308,474 which issued Dec. 29, 1998. The alloys described therein (e.g., Tb-Dy-Fe alloys) have been found to be useful in magnetostrictive transducers, delay lines, variable frequency resonators and filters.

Another group of alloys based on rare earth-iron-boron compositions is described by Schmidt et al in U.S. Pat. No. 4,612,047 issued Sept. 16, 1986 and by Seon et al in U.S. Pat. No. 4,636,353 issued Jan. 13, 1987. The alloys (e.g., Nd-Fe-B) exhibit highly desirable magnetic properties for use as permanent magnets.

The commercialization of these rare earth-transition metal alloys has progressed to the point that relatively large quantities of rare earth-transition metal alloy scrap have been generated from the various manufacturing operations used to fabricate the alloys into suitable magnet components, electrical components and the like. The rare earth-transition metal alloy scrap generated by these fabrication operations varies considerably in form from dry, bulky relatively large scrap pieces to a fine powder or dust referred to as "swarf".

Industries that fabricate rare earth-transition metal alloys into articles of manufacture require some method to dispose of the scrap and recover the valuable rare earth material in a form amenable for reuse. In particular, a treatment process is needed that allows recovery of a rare earth metal salt (e.g., a rare earth metal fluoride) for use in the thermite reduction process (described by Schmidt et al. in U.S. Pat. No. 4,612,047) or for use in other metallothermic processes for preparing the respective rare earth metal or alloy. Moreover, a treatment method should be provided for treating iron-bearing wastes that typically will result from the rare earth recovery treatment process.

An object of the invention is to address these needs by providing a relatively low cost, wet method of treating rare earth-transition metal alloy scrap in a manner to recover the rare earth metal thereof for use in the thermite or other metallothermic reduction process for preparing the respective rare earth metal or alloy.

Another object of the invention is to provide a relatively low cost, wet method of treating transition metal (e.g., iron)-bearing waste solutions that result from the rare earth recovery treatment to recover the transition metal for reuse.

SUMMARY OF THE INVENTION

The present invention involves a unique, wet method of treating rare earth-transition metal alloy scrap comprising forming an acid sulfate solution having the rare earth and the transition metal of said scrap dissolved therein, adding to the solution a salt of an alkali element or ammonium and establishing a solution pH effective to selectively precipitate a sulfate salt of the rare earth and the alkali element or ammonium, and separating the precipitated sulfate salt from the solution.

In one embodiment of the invention, the acid sulfate solution of dissolved rare earth (e.g., Nd) and transition metal (e.g., Fe) is provided by dissolving the scrap in a sulfuric acid solution. The resulting solution is treated with NaOH, KOH or $NH_4OH$ added thereto in an amount to raise the pH to above about 1.5 and below about 2.0, to selectively precipitate the double sulfate salt of the rare earth and alkali element or ammonium, leaving the transition metal (Fe) in solution.

In another embodiment of the invention, the double sulfate salt is further treated to form a rare earth salt, such as preferably a rare earth fluoride, amenable for use in the thermite or other metallothermic reduction process to produce a rare earth metal or alloy. For example, the sulfate salt is treated by reacting it with an aqueous HF solution in a manner to selectively precipitate a rare earth fluoride while leaving substantial transition metal in soluble form in the solution. Alternately, the double sulfate salt is treated by reacting it with an aqueous oxalic acid solution in a manner to selectively precipitate a rare earth oxalate. The rare earth oxalate is then heated (roasted) to form a rare earth oxide. The rare earth oxide is then fluorinated to form a rare earth fluoride amenable for use in the thermite or other metallothermic reduction process.

In still another embodiment of the invention, the solution (after precipitation of the sulfate salt) is further treated to selectively precipitate a transition metal (e.g., iron) compound therefrom so as to recover the transition metal present in the scrap. For example, in the event the transition metal is iron, the solution is treated by adding an oxidant and alkali hydroxide in a manner to selectively precipitate iron jarosite. If the alloy scrap includes iron and cobalt, the iron can be selectively precipitated from the spent solution as iron jarosite to recover the iron and then the cobalt can be recovered from the spent solution by solvent extraction using a suitable organic extractant.

In a still further embodiment of the invention for treating rare earth-transition metal-boron alloy scrap, the rare earth and the transition metal can be recovered as described. The boron in the scrap can be recovered by treating the spent solution in a manner to form a borate compound, such as hydrated zinc borate.

The method of the invention is useful in treating a wide variety of rare earth-transition metal alloy scrap wherein the scrap comprises a) one or more transition metals such as Fe, Co and Ni, b) one or more rare earth such as Nd, Dy, Tb, Pr, Sm, Ho, La, Ce, Eu, Gd, Er, Tm, Yb, Lu, Y, and Sc and c) other optional alloyants such as boron, Zr, Nb, Ga, Al and others. In treating rare earth-transition metal alloy scrap including two or more rare earth metals (e.g., Tb-Dy-Fe), the method of the invention is effective to recover mixed rare earth salts which can be treated further for use in the thermite or other metallothermic reduction processes.

The aforementioned objects and advantages of the invention will become more readily apparent from the following detailed description and the drawing.

DESCRIPTION OF THE DRAWING

The Figure is a flow sheet illustrating sequential method steps of one embodiment of the invention.

DETAILED DESCRIPTION OF THE INVENTION

Referring to the Figure, the various steps involved in practicing one particular embodiment of the invention are illustrated. In this particular embodiment of the invention, rare earth-transition metal scrap is typically received from one or more fabricating operations, either on-site or off-site. The scrap may optionally be segregated (graded) by alloy composition, size, shape, and other factors. For example, fine, pyrolytic rare earth-transition metal dust or powder (referred to as swarf) of like or similar composition is segregated for treatment whereas dry, bulky scrap pieces of the same or similar composition are segregated into one or more groups by size and shape for treatment.

Swarf will typically comprise fine powder or particulates in the particle size range of less than 50 microns produced by such fabrication operations as abrasive cutting and grinding. Both swarf and bulky scrap pieces may be treated in accordance with the invention in the as-received condition. If desired, bulky scrap pieces may optionally be ground in suitable manner into particulate form (e.g., particle sizes of less than about 500 microns) for treatment.

The method of the invention is useful in treating a wide variety of binary, ternary, and other rare earth-transition metal alloy compositions. Rare earth-transition metal scrap treatable in accordance with the invention will comprise a) one or more transition metals such as Fe, Co and Ni, b) one or more rare earths such as Nd, Dy, Tb, Pr, Sm, Ho, La, Ce, Eu, Gd, Er, Tm, Yb, Lu, Y, and Sc, and c) other optional alloyants such as boron, Zr, Nb, Ga, Al as well as other non-metallics and metallics that may be used for one reason or another in the alloy compositions.

Referring again to the Figure, the rare earth-transition metal alloy scrap is initially dissolved in an aqueous sulfuric acid solution typically without the need for externally supplied heat or agitation. An acid sulfate leach solution having the rare earth, transition metal and other alloyants present, such as boron, dissolved therein is thereby formed. For dissolving Nd-Fe-B alloy magnet scrap having the typical composition of about 30 weight % Nd, about 69 weight % Fe and about 1 weight % B, a preferred ratio of scrap to sulfuric acid solution comprises 100 grams of scrap material to 1000 mL (milliliter) of 2 molar sulfuric acid. This ratio effects complete dissolution of the scrap while maintaining a low enough pH to prevent precipitation of ferric hydroxide. The final pH of the leach solution after dissolution of the scrap is approximately 0.2. For higher acid molarity and greater weight of scrap, Nd and Fe sulfate solubilities are exceeded.

For the Nd-Fe-B alloy scrap composition described above, the composition of the leach solution is typically on the order of 69 grams/L Fe, 30 grams/L Nd, and 1 gram/L B. The invention is not limited to the specific ratio of scrap to sulfuric acid solution described above, and other ratios may be used depending upon the composition of the alloy scrap. Even extremely oxidized forms of scrap can be dissolved by the sulfuric acid and treated in accordance with the invention.

The leach solution containing the dissolved rare earth, transition metal and boron or other alloyant, if present, is conventionally filtered to remove insoluble trace impurities and to yield a final leach solution rich in dissolved rare earth (e.g., Nd) and transition metal (e.g., Fe). Boron, if present in the scrap, dissolves also. However, the boron concentration in the solution is much lower as a result of the relative low content of boron in the scrap (e.g., 1 weight %).

Referring to the Figure, the filtered leach solution is then reacted with an alkali hydroxide (e.g., NaOH or KOH) or ammonium hydroxide ($NH_4OH$) to selectively precipitate a double sulfate salt of the rare earth and the alkali element or ammonium, while leaving the transition metal (e.g., Fe) in solution. The precipitated double sulfate salt is a discrete chemical compound with its own completely unique X-ray diffraction pattern. Double sulfates have been listed in the literature having formulas such as $Nd_2(SO_4)_3 \cdot Na_2SO_4 \cdot 6H_2O$, $Nd_2(SO_4)_3 \cdot 3Na_2SO_4 \cdot 12H_2O$ or $NaNd(SO_4)_2 \cdot nH_2O$ where n is 0 or 1. For the Nd-Fe-B alloy scrap composition described above, enough hydroxide is added to the leach solution to raise the pH to about 1.5 or slightly above but below about 2.0. Raising the pH to values above 2 causes precipitation of undesirable Fe hydroxide along with the desired double sulfate salt. Below pH values of about 1.5, maximum recovery of Nd or other rare earth is not attained. The recovery of Nd in this situation is typically approximately 98 percent.

For the Nd-Fe-B alloy magnet scrap composition described above, the average composition of the Nd-alkali double sulfate salt corresponds to approximately 35 weight % Nd, 4–6 weight % alkali ion depending upon the particular alkali element present, less than about 0.2 weight % Fe and little or no B with the remainder of the salt comprising sulfate ions and waters of hydration.

When NaOH is used to precipitate a Nd-Na double sulfate salt, the Nd concentration of the leach solution at pH 1.6 is less than about 0.2 grams/L (liter). When KOH is used to precipitate a Nd-K double sulfate salt, a similar Nd solubility is observed at pH 1.6. On the other hand, when a Nd-ammonium double sulfate is produced by adding $NH_4OH$ to the solution, the Nd concentration of the solution at pH 1.6 is approximately 6 grams/L as a result of the increased solubility of the Nd-ammonium double sulfate salt. The invention contemplates formation of rare earth-alkali double sulfate salts or rare earth-ammonium double sulfate salts.

Referring again to the Figure, the double sulfate salt is next converted to a rare earth salt amenable for use in the thermite or other metallothermic reduction process. One conversion technique involves reacting the double sulfate salt with an aqueous HF solution to form a rare earth fluoride. For example, for the Nd-Fe-B alloy magnet composition described above, the Nd-alkali or Nd-ammonium double sulfate salt precipitated from the leach solution and filtered is reacted with 2.6 molar aqueous HF solution wherein the fluoride ion is present in an amount of about 3 times the stoichiometric amount needed for complete conversion of the double sulfate salt to $NdF_3$. The weight ratio of HF to water can vary from about 1:20 to about 1:2.5 with equivalent precipitation results. The solution is agitated for about 10 minutes at room temperature to complete the conversion. The $NdF_3$ precipitate is readily separated from the solution by conventional filtering. The resultant $NdF_3$ precipitate exhibits high purity (e.g., less than 0.2 weight % Fe) and distinct crystalline structure when analyzed by x-ray diffraction. The $NdF_3$ precipitate exhibits a nearly stoichiometric composition (e.g., Nd content measured at 72.9 weight % versus 72.7 weight % for stoichiometric composition).

For longer agitation times, the Nd content of the NdF$_3$ precipitate was observed to decrease while the Fe content increased. As a result, agitation times not exceeding about 10 minutes (under the conditions set forth above) are recommended.

An alternate conversion technique involves reacting the double sulfate salt with an aqueous oxalic acid solution to produce rare earth oxalate which can be readily filtered from the solution and then converted to rare earth oxide by heating to elevated temperature (i.e., roasting). For example, 6 grams of the Nd-alkali double sulfate salt can be reacted with 350 mL of a 0.2 molar aqueous oxalic acid solution to produce the Nd oxalate which can then be heated to 900° C. for a time to convert it to Nd$_2$O$_3$. The weight ratio of oxalic acid to water can vary from about 1:14 to 1:6 with equivalent result. The Nd oxalate produced typically includes less than about 0.15 weight % Fe.

The rare earth fluoride produced by the HF reaction technique can be dried and then used as a reactant salt (i.e., rare earth fluoride) in the thermite reduction process described in U.S. Pat. No. 4,612,047, the teachings of which are incorporated herein by reference, or in other metallothermic reduction processes, to produce rare earth metal or alloy, FIG. 1. The rare earth oxide produced by the oxalic acid technique can be fluorinated by NH$_4$F to form rare earth fluoride which, after drying, is also usable in these metallothermic processes.

The spent solution remaining after precipitation of the double sulfate salt can be further treated in accordance with the invention to recover the iron dissolved therein. For example, the iron and boron-rich spent solution is treated to remove iron as an iron jarosite, MFe$_3$(SO$_4$)$_2$(OH)$_6$ where M is an alkali ion. In particular, an oxidant, such as hydrogen peroxide, is added to the solution to ensure oxidation of ferrous ion to ferric ion. Typically, 30 grams of 50 percent H$_2$O$_2$ per 100 grams of initial scrap dissolved is added to the solution to this end. Other oxidants such as Na$_2$O$_2$, Na$_2$SO$_4$ and (NH$_4$)S$_2$O$_8$ may be used in conjunction with or in lieu of H$_2$O$_2$ to provide a higher concentration of alkali ion for jaroiste precipitation. The pH of the solution is raised to about 2 by addition of alkali hydroxide of the appropriate type. The solution is then agitated and aerated (bubbling air) at 90° C. for six hours after which Fe recoveries of 90-95% are achieved. Lower pH values and H$_2$O$_2$ additions result in lower Fe recoveries. The resulting iron jarosite precipitate is readily separated from the solution by filtering, is stable and can be easily disposed of or treated by known techniques to produce hematite which has potential application in the manufacture of paint pigments.

Residual rare earth (Nd) present in the spent solution is precipitated with the iron jarosite when the alkali, M, of the jarosite is Na. On the other hand, when the M of the jarosite is ammonium, the residual rare earth remains in solution. Since this solution (resulting from iron-ammonium jarosite precipitation) still contains about 6 grams/L Nd, a further precipitation step such as addition of NaOH would permit recovery of the remaining Nd. Boron remains in the spent solution and can be removed/recovered, if desired, by subsequent precipitation as a hydrated zinc borate using a technique described in The Encyclopedia of Chemical Technology, Kirk-Othomer Third Ed. Vol 4 p. 106 Wiley Interscience Publishers, John Wiley & Sons NY.

As mentioned above, the rare earth-transition metal alloy scrap may include one or more rare earths; e.g., Nd and Dy or Tb and Dy. The present invention has the capability to recover each of the rare earths when present in the alloy composition. Due to the differential solubilities of the rare earth double sulfate salts in sodium sulfate solutions, separations of the Cerium group (La-Eu), which includes Nd, from the Yttrium group (Gd-Lu and Y) can readily be made as suggested by F. A. Cotton & G. Wilkinson Advanced Inorganic Chemistry, 3rd Ed. (New York, NY: Interscience Publishers, 1972) p. 1067. Following precipitation of a mixed rare earth-alkali double sulfate salt, further separations of Nd from other lanthanides can be achieved by solvent extraction or ion exchange techniques.

Furthermore, some magnet manufacturers generate mixed scrap materials comprising SmCO$_5$ scrap and Nd$_2$Fe$_{14}$B scrap. The present invention can treat such mixed scrap by dissolving it in the sulfuric acid solution to provide a mixed-constituent leach solution. The various rare earth metals are then co-precipitated by treating the leach solution with alkali or ammonium hydroxide followed by further treatment of the double sulfate salt to effect separation of the different rare earth metals (e.g., Sm and Nd). This separation could be accomplished using solvent extraction or ion exchange techniques described by H. Seto & T. Mori in "The Separation of and Purification of Rare-Earth Elements—Solvent Extraction and Ion-Exchange Chromatography", Metallurgical Review of MMIJ Vol 6(2), 1989 pp. 139-162.

As also mentioned above, the rare earth-transition metal alloy scrap may include one or more transition metals; e.g., Fe and Co. The present invention has the capability to recover each of these transition metals when present in the alloy scrap composition. For example, precipitation of the aforementioned iron jarosite as described above is effective to remove the bulk of the iron. Because Co is divalent, it does not readily substitute for ferric ion in the jarosite lattice such that minimal Co is lost in the jarosite precipitation step. The spent solution (after jarosite precipitation) is then treated to solvent extraction with DEHPA (di-2-ethyl-hexyl-phosphoric acid) available from Mobil Chemicals, Richmond, VA, to remove residual iron followed by solvent extraction with an organic extractant such as Cyanex 272 di-alkyl phosphonic acid and available from Cyanamid Canada Inc., Niagara Falls, Ontario to recover the Co in solution.

Moreover, other alloyants such as Zr, Nb, Ga, and Al can be recovered in practicing the invention by additional processing steps to separate and recover these other metal values. Treatment of acid leach residues to recover insoluble constituents as well as procedures to recover metal values in solution can be used to this end.

The following Examples are offered to illustrate the invention in further detail without limiting the scope thereof.

EXAMPLE 1

One hundred grams of sintered permanent magnet scrap containing by weight 71% Fe, 28% Nd, and 1% B was dissolved in 1 L of 2M H$_2$SO$_4$. No supplemental agitation or heat was added during the leaching. Only a trace of undissolved residue remained after 24 hours of contact. Following the dissolution, the pH of the pregnant filtrate was raised to 1.5 with the addition of saturated NaOH solution to precipitate a neodymium-sodium double sulfate salt. 98% of the neodymium was recovered from the feed material. The double sulfate salt contained by weight 0.2% Fe, 34.3% Nd, 5.74% Na, 59.76% $SO_4$. The double salt was then converted to neodymium fluoride by agitating the salt at ambient temperature in 660 ml of 2.6 M HF. The resulting fluoride product was by weight 71.6% Nd, 0.5% Fe, 24.7% F, 2.3% $SO_4$ and 1.8% Na. Neodymium losses were negligible during the conversion process. The iron-boron filtrate was adjusted with saturated NaOH to bring the pH to 2.0. Thirty grams of 50% hydrogen peroxide was added to the solution and contacted for 6 hours at 90° C. to produce an iron jarosite.

EXAMPLE 2

One hundred grams of sintered permanent magnet scrap containing by weight 71% Fe, 28% Nd, and 1% B was dissolved in 1 L of 2M $H_2SO_4$. No supplemental agitation or heat was added during the leaching. Only a trace of undissolved residue remained after 24 hours of contact. Following the dissolution, the pH of the pregnant filtrate was raised to 1.5 with the addition of saturated $NH_4OH$ solution to precipitate a neodymium-ammonium double sulfate salt. 70% of the neodymium was recovered from the original scrap. The double sulfate salt contained by weight 0.136% Fe, 33.4% Nd, 4.0% $NH_4$, and 62.46% $SO_4$. The double salt was then converted to neodymium fluoride by agitating the salt at ambient temperature in 410 ml of 2.6 M HF. The resulting fluoride product was by weight 67.2% Nd, 0.08% Fe, 29.6% F, 2.8% $SO_4$ and 0.3% $NH_4$. Neodymium losses were negligible during the conversion process. The iron-boron filtrate was adjusted with saturated $NH_4OH$ to bring the pH to 2.0. Thirty grams of 50% hydrogen peroxide was added to the solution and contacted for 6 hours at 90° C. to produce an iron jarosite. Additional neodymium was recovered from the jarosite effluent by pH adjustment and heating.

EXAMPLE 3

One hundred grams of magnet slag containing by weight 55.0% Fe, 40.0% Nd, 1.0% B, and 0.5% Pr were treated in a manner outlined in Example 1. The neodymium-sodium double sulfate salt precipitated from the leach solution filtered readily and was easily converted to a fluoride. Iron present in the final filtrate was removed as a jarosite.

EXAMPLE 4

One hundred grams of a mixed rare-earth swarf that contained by weight 30.8% Fe, 11.6% Nd, 6.7% Sm, 14.7% Co, 0.28% Ni, 1.35% Cu, 2.4% Al, and 0.40% B, were treated in a manner outlined in Example 1. Not all of the feed material dissolved using 2M $H_2SO_4$, but the residue was easily filtered. 15.8 grams of residue remaining after the leach was composed of (by weight) 6.75% Al, 21.8% Co, 4.73% Cu, 7.39% Fe, 0.123% Nd, 0.446% Ni and 10.2% Sm. All of the rare-earths present in the pregnant leach solution report to the double sulfate salt precipitate and are readily separated by filtration. The filtrate contains base metals and boron. Iron is removed using the technique described in Example 1.

EXAMPLE 5

One hundred grams of plastic-coated waste magnet material containing by weight 71% Fe, 28% Nd, and 1% B was first crushed in a jaw crusher to break the acid-impermeable coating that covered the scrap. Following the size reduction, the crushed material was dissolved in 1 L of 2M $H_2SO_4$. The scrap readily dissolved leaving the insoluble coating. The solids were separated by filtration and a metal rich filtrate was treated using the technique described in Example 1.

The present invention is advantageous in that relatively inexpensive, easily handled sulfuric acid is employed to dissolve the rare earth-transition metal alloy scrap. The scrap can be treated with minimal pretreatment steps such as roasting. Moreover, contaminated, oxidized scrap is treatable in accordance with the invention. The precipitation reactions involved are carried out in acidic solutions using inexpensive alkali or ammonium hydroxides by varying the pH within a relatively narrow range without the need for extensive neutralization or careful control of reaction parameters, such as temperature and/or reagent addition. The double sulfate salts produced contain very low concentrations of the transition metal (e.g., Fe). A relatively pure rare earth salt, rare earth fluoride and oxalate (after fluorination), is produced and is amenable for use in the thermite or other metallothermic reduction process to produce rare earth metal or alloy. Moreover, the transition metal (e.g., Fe) is recoverable from the scrap. As mentioned above, the invention is capable of treating rare earth-transition metal alloy scrap having a variety of compositions.

While the invention has been described in terms of specific embodiments thereof, it is not to be limited thereto but rather only to the extent set forth in the following claims.

We claim:
1. A method of treating rare earth-transition metal alloy scrap, comprising the steps of:
   a) forming an acid sulfate solution having the rare earth and the transition metal of said scrap dissolved therein,
   b) adding to the acid sulfate solution a salt of an alkali element or ammonium and establishing a solution acid pH effective to precipitate from the solution an insoluble double sulfate salt of the rare earth and the alkali element or ammonium, and
   c) separating the precipitated sulfate salt from the solution.

2. The method of claim 1 wherein in step (b), a double sulfate salt of the rare earth and the alkali element or ammonium is precipitated.

3. The method of claim 1 including the additional step of treating the sulfate salt to form a rare earth salt.

4. The method of claim 3 wherein the sulfate salt is treated by reacting it with an aqueous HF solution in a manner to selectively precipitate a rare earth fluoride.

5. The method of claim 4 wherein HF acid is present in an excess amount beyond the stoichiometric amount needed to convert the sulfate salt to rare earth fluoride.

6. The method of claim 3 wherein the sulfate salt is treated by reacting it with an oxalic acid solution in a manner to selectively precipitate a rare earth oxalate.

7. The method of claim 6 including heating the rare earth oxalate to form a rare earth oxide.

8. The method of claim 4 including the additional step of reducing the rare earth fluoride by a metallothermic reduction process.

9. The method of claim 7 including the additional steps of fluorinating the rare earth oxide to form rare earth fluoride and then reducing the rare earth fluoride by a metallothermic reduction process.

10. The methods of claims 8 or 9 wherein the rare earth fluoride is reduced by a reducing metal in the presence of iron.

11. The method of claim 1 wherein the salt comprises NaOH, KOH or NH$_4$OH.

12. The method of claim 1 wherein the solution separated in step c) is further treated to selectively precipitate an iron compound therefrom so as to recover iron in the scrap.

13. The method of claim 12 wherein the solution is treated to precipitate iron jarosite.

14. The method of claim 13 wherein the solution is treated by adding an oxidant and an alkali hydroxide.

15. A method of treating rare earth-transition metal-boron alloy scrap, comprising the steps of:
   a) dissolving the scrap in an aqueous sulfuric acid solution,
   b) adding to the solution of dissolved rare earth metal, transition metal and boron a salt of an alkali element or ammonium and establishing a solution acid pH effective to selectively precipitate an insoluble double sulfate salt of the rare earth and the alkali element or ammonium from the solution, and
   c) separating the precipitated double sulfate salt from the solution.

16. The method of claim 15 including the additional step of treating the double sulfate salt to form a rare earth salt.

17. The method of claim 16 wherein the double sulfate salt is treated by reacting it with an aqueous HF solution in a manner to selectively precipitate a rare earth fluoride.

18. The method of claim 17 wherein HF acid is present in an excess amount beyond the stoichiometric amount needed to convert the double sulfate salt to rare earth fluoride.

19. The method of claim 16 wherein the double sulfate salt is treated by reacting it with an oxalic acid solution in a manner to selectively precipitate a rare earth oxalate.

20. The method of claim 19 including heating the rare earth oxalate to form a rare earth oxide.

21. The method of claim 17 including the additional step of reducing the rare earth fluoride by a metallothermic reduction process.

22. The method of claim 20 including the additional steps of fluorinating the rare earth oxide to form rare earth fluoride and reducing the rare earth fluoride by a metallothermic reduction process.

23. The methods of claims 21 or 22 wherein the rare earth fluoride is reduced by a reducing metal in the presence of iron.

24. The method of claim 15 wherein the salt comprises NaOH, KOH or NH$_4$OH.

25. The method of claim 24 wherein the salt is added to the solution in an amount to raise the pH to between about 1.5 and about 2.0.

26. The method of claim 15 wherein the solution separated in step c) is further treated to selectively precipitate an iron compound therefrom so as to recover iron in the scrap.

27. The method of claim 26 wherein the solution is treated to precipitate iron jarosite.

28. The method of claim 27 wherein the solution is treated by adding an oxidant and an alkali hydroxide.

29. The method of claim 27 including the additional step of treating the solution from which the iron jarosite precipitates to precipitate a boron compound so as to recover boron in the scrap.

30. A double sulfate salt of a rare earth and an alkali element or ammonium.

31. The salt of claim 30 wherein the rare earth comprises Nd.

32. The salt of claim 30 wherein the alkali element comprises Na or K.

33. A method of treating rare earth-ion alloy scrap, comprising the steps of:
   a) forming an acid sulfate solution having the rare earth and the iron of said scrap dissolved therein,
   b) adding NaOH, KOH or NH$_4$OH to the acid sulfate solution and establishing an solution acid pH effective to precipitate from the solution on insoluble double sulfate salt of the rare earth and the alkali element or ammonium, and
   c) separating the precipitated sulfate salt from the solution.

34. The method of claim 33 wherein the sulfate salt is treated by reacting it within aquoeus HF solution in a manner to selectively precipitate a rare earth fluoride.

35. The method of claim 33 wherein the sulfate salt is treated by reacting it with an oxalic acid solution in a manner to selectively precipitate a rare earth oxalate.

36. The method of claim 35 including heating the rare earth oxalate to form a rare earth oxide.

37. A method of treating rare earth-iron-boron alloy scrap, comprising the steps of:
   a) dissolving the scrap in an aqueous sulfuric acid solution,
   b) adding NaOH, KOH or NH$_4$OH to the solution of dissolved rare earth metal, iron and boron and establishing a solution acid pH effective to selectively precipitate an insoluble double sulfate salt of the rare earth and the alkali element or ammonium from the solution, and
   (c) separating the precipitated double sulfate salt from the solution.

38. The method of claim 37 wherein the double sulfate salt is treated by reacting it with an aqueous HF solution in a manner to selectively precipitate a rare earth fluoride.

39. The method of claim 37 wherein the double sulfate salt is treated by reacting it with an oxalic acid solution in a manner to selectively precipitate a rare earth oxalate.

40. The method of claim 39 including heating the rare earth oxalate to form a rare earth oxide.

* * * * *